United States Patent [19]
Yang et al.

[11] Patent Number: 5,816,966
[45] Date of Patent: Oct. 6, 1998

[54] BICYCLE FRONT DERAILEUR WITH A SMOOTH GEAR SWITCHING MECHANISM

[75] Inventors: Yann-Jy Yang; Kwang-Shyan Ho, both of Hsinchu; Pai-Hsiang Hsu, Tainan; Ching-Huan Tseng, Chutung; Ying-Shou Chen, Kaoshiung, all of Taiwan

[73] Assignee: Industrial Technology Research Institute, Hsinchu, Taiwan

[21] Appl. No.: 825,289

[22] Filed: Mar. 27, 1997

[51] Int. Cl.⁶ .................................................. F16H 59/00
[52] U.S. Cl. ................................................................ 474/82
[58] Field of Search ................................... 474/78, 80–82

[56] References Cited

U.S. PATENT DOCUMENTS

| | | |
|---|---|---|
| 5,037,355 | 8/1991 | Kobayashi ................................. 474/82 |
| 5,104,358 | 4/1992 | Kobayashi ................................. 474/82 |
| 5,312,301 | 5/1994 | Kobayashi ............................ 474/82 X |

Primary Examiner—Roger J. Schoeppel
Attorney, Agent, or Firm—W. Wayne Liauh

[57] ABSTRACT

A bicycle front derailleur with a cam level for smoother gear switching is disclosed. The bicycle derailleur is operated by pulling a wire which shifts a chain between at least a large sprocket, a medium sprocket and a small sprocket. The bicycle front derailleur contains a cam lever which is pivotably connected to a four-linkage chain guide moving system at a pivoting point for pulling the chain guide moving system, and thus shifting the chain, when a cable is pulled in a pulling direction. The cam lever has a cam groove formed on the peripheral surface of the cam lever for receiving the wire. The cam lever is structured such that the radial distance between the cam groove and the pivoting point increases in a direction opposite of the pulling direction, so as to provide a greater effective length vertical to the pulling direction when the wire is subject to a greater linear displacement resulting in a greater counterforce. Such an increased effective length provides a greater torque at the same pulling force.

11 Claims, 14 Drawing Sheets

BICYCLE FRONT DERAILEUR WITH A SMOOTH GEAR SWITCHING MECHANISM

BACKGROUND OF THE INVENTION

1. Field of the Invention

The present invention relates to a bicycle front derailleur, particularly to a bicycle front derailleur, which allows a bicycle rider to switch gears smoothly.

2. Description of Related Art

Figure 9:
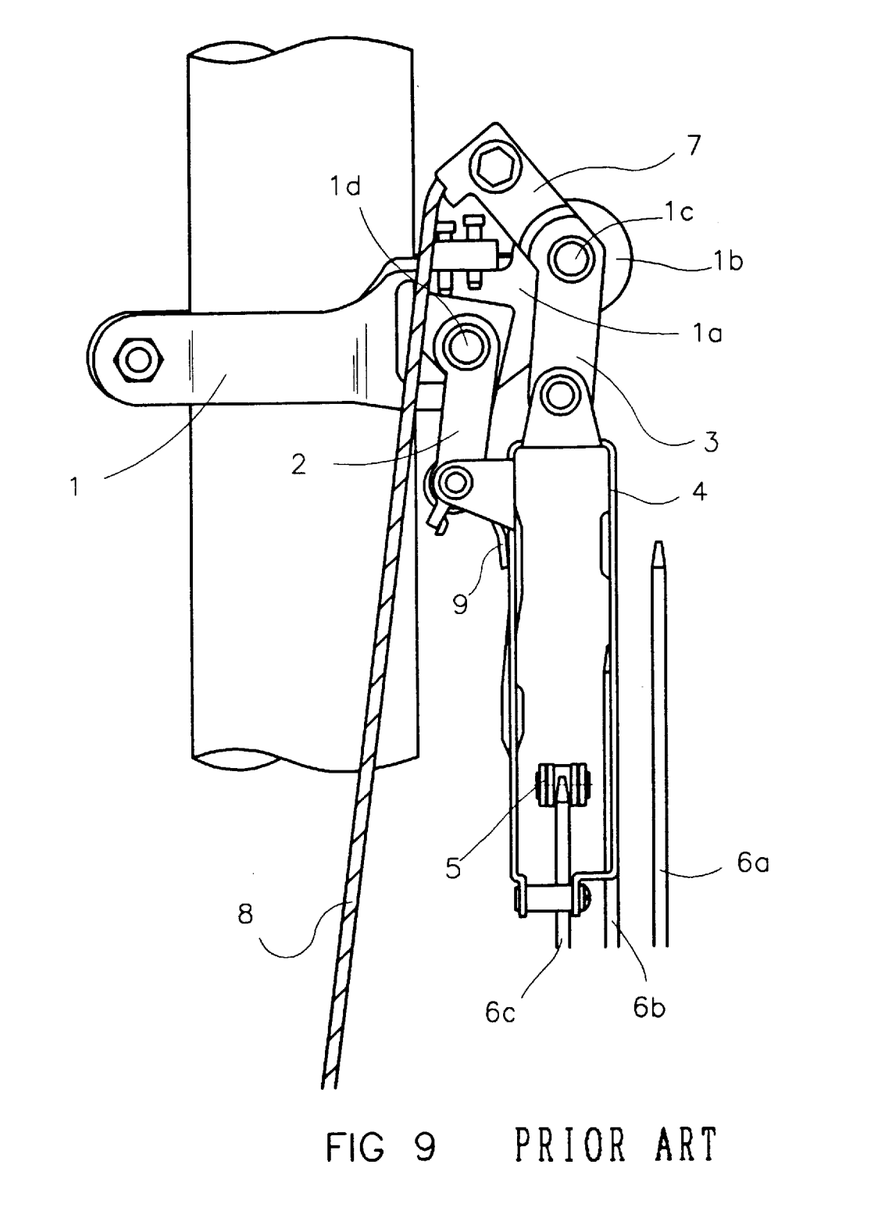
FIG. 9 (prior art) is a schematic illustration of a conventional bicycle front derailleur.
Figure 10:
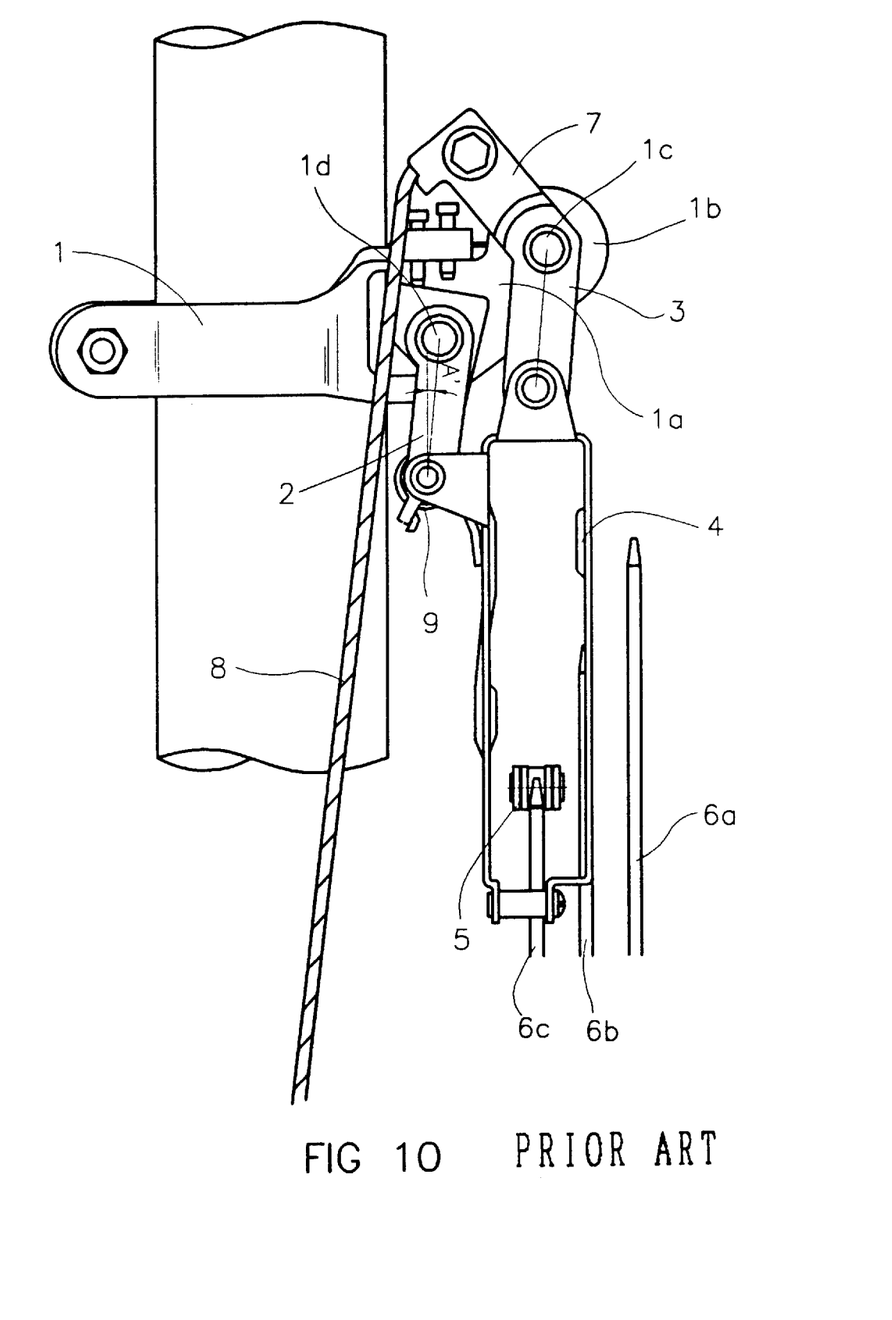
FIG. 10 (prior art) is a schematic illustration of the working of a conventional bicycle front derailleur in the lowest gear, with the moving space of the first and the second links.
Figure 11:
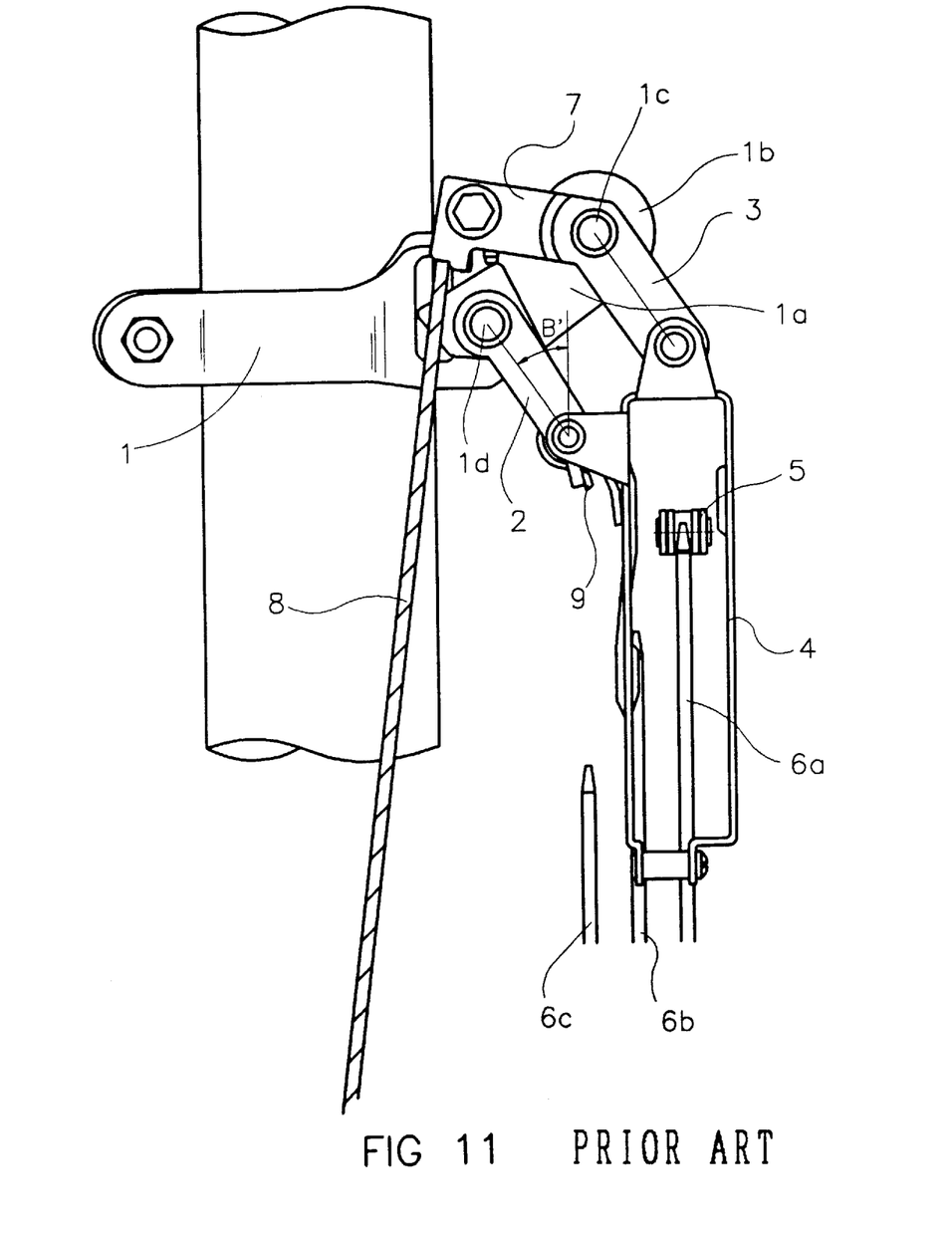
FIG. 11 (prior art) is a schematic illustration of the working of a conventional bicycle front derailleur in the highest gear, with the moving space of the first and the second links.
Figure 12:
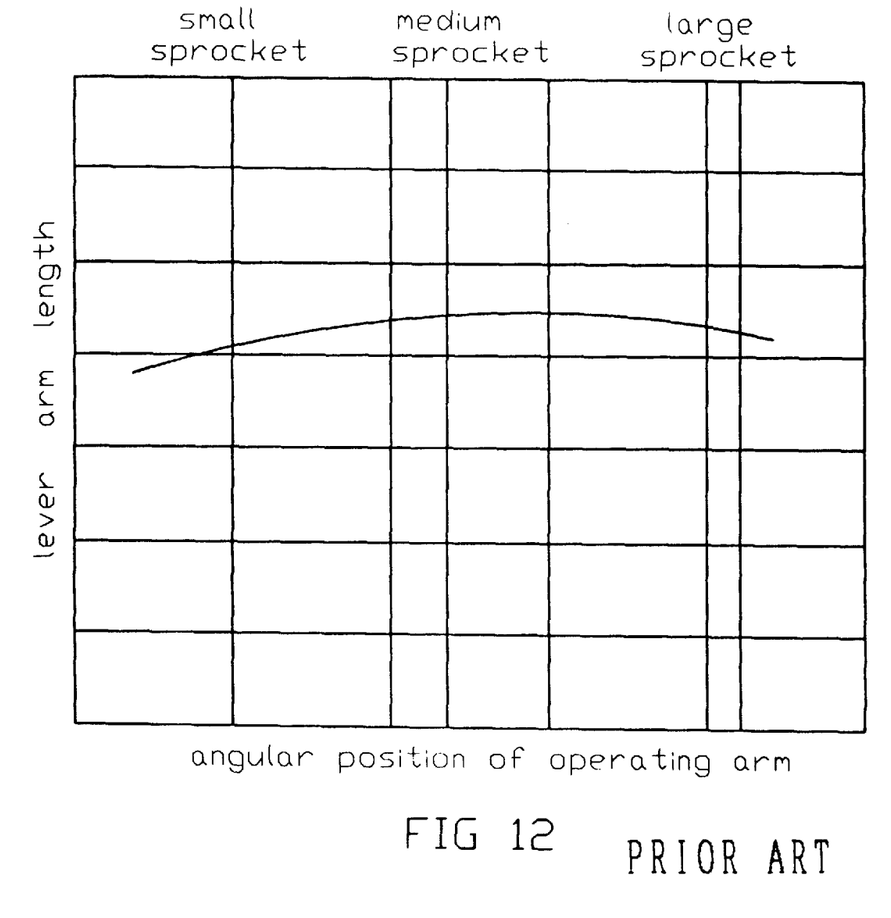
FIG. 12 (prior art) is a diagram of the lever arm length as a function of the angular position of the lever of a conventional bicycle front derailleur.

A conventional bicycle derailleur is made of a shiftlever, a wire, sprockets, a freewheel, a front derailleur, a rear derailleur and a chain. As shown in FIGS. 9–11, for changing a chain 5 between a large sprocket 6a, a medium sprocket 6b and a small sprocket 6c, the following setup is used: From a clamp 1, a fixing part 1a extends away to a far end 1b. A first link 2 and a second link 3 are on joints 1c, 1d hingedly connected to the fixing part 1a, with joint 1c being close to the far end 1b. A chain guide 4 lifts the chain 5 and moves it between the sprockets 6a, 6b, 6c.

The second link 3 continues beyond joint 1c end to form an operating arm 7, which forms an inclined angle with the second link 3, with a wire 8 attached on the upper end of the operating arm 7. When the wire 8 is pulled, the lever and, along with it, the second link 3 turn around the joint 1c, raising the chain guide 4, which in turn lifts the chain 5 from the sprocket it was engaged with. Releasing the wire 8 causes the chain guide 4 by the elastic force of a spring 9 between the first link 2 and the chain guide 4 to go down again, engaging the chain 5 with the desired sprocket.

Figure 13A:
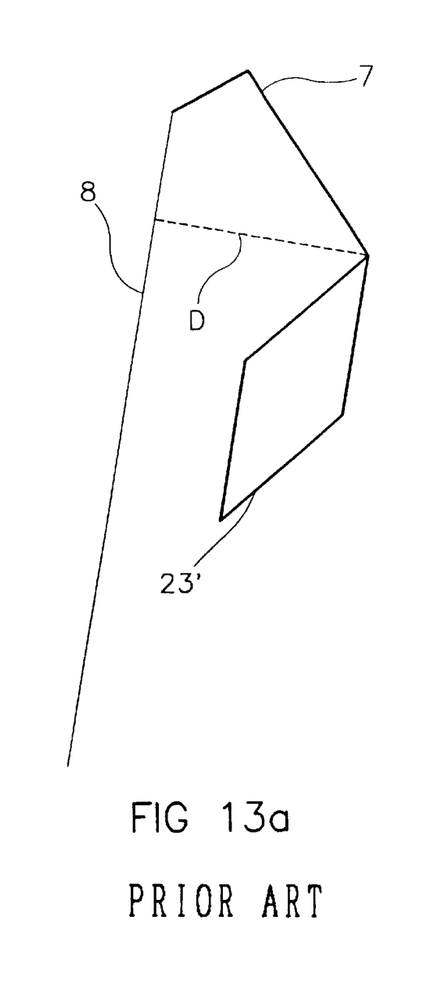
FIG. 13a, 13b, 13c (prior art) are schematic illustrations of the lever arm length of a conventional bicycle front derailleur at various angular positions.
Figure 13B:
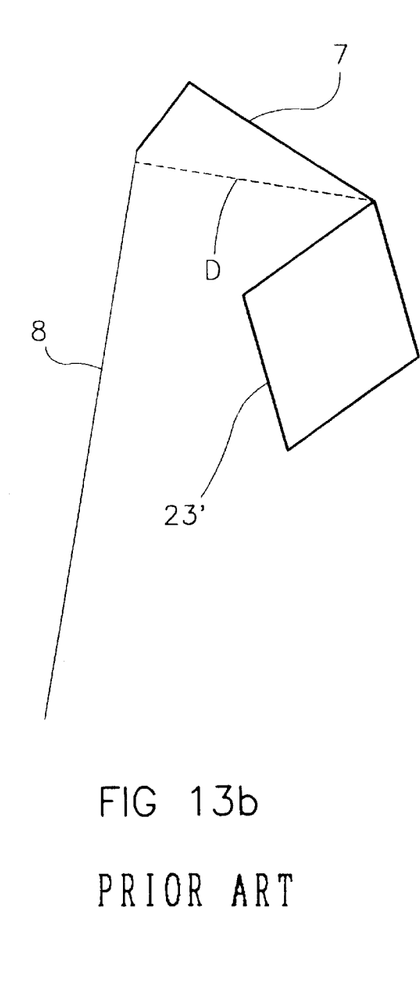
Figure 13C:
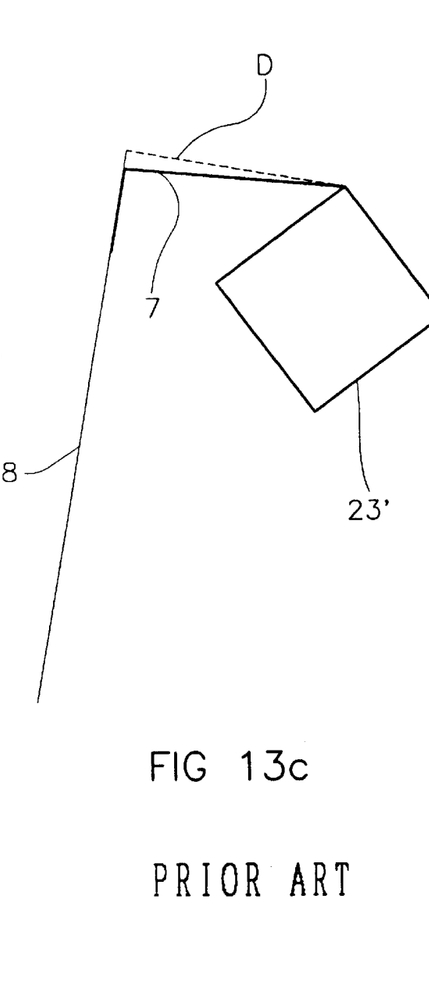

This arrangement allows for changing gears, but has the folowing disadvantages:

1. Changing gears in the way described above requires overcoming the elastic force of the spring 9 as well as the tension of the chain 5. This is done by applying a torque on the operating arm 7 by pulling the wire 8. The force thereby applied has, with respect to the operating arm 7, a parallel and a perpendicular component, which alone is effective for applying a torque. As shown in FIGS. 13a, 13b, 13c these components change with the angular position of the operating arm 7. The counterforce to be overcome, when the wire 8 is pulled to switch into high gear, increases strongly with the displacement of the wire 8. So the force on the wire 8 has to be increased as well, and, as a result it is not possible to shift gears smoothly and conveniently with constant force.

Figure 14:
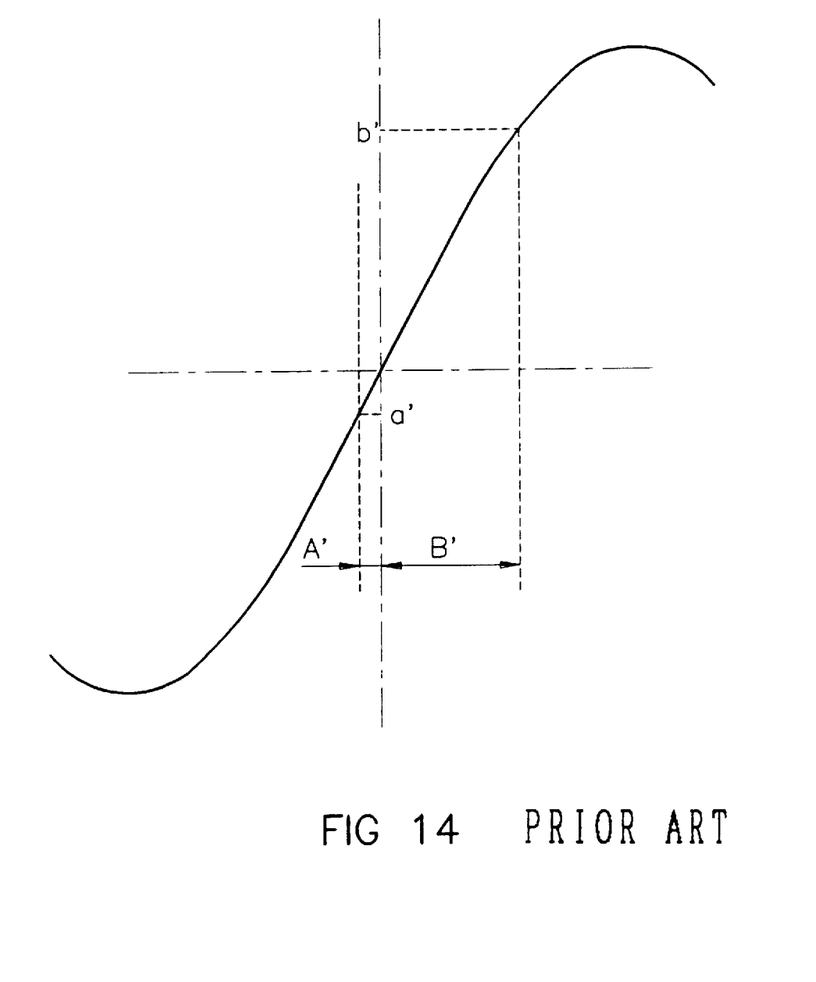
FIG. 14 (prior art) is a diagram of the horizontal position of the chain guide as a function of the angular position of the lever of a conventional bicycle front derailleur.

2. The horizontal position of the chain guide 4 as a fuction of the angular position of the first and second links 2, 3 follows a non-linear, symmetrical curve with an almost linear middle section, as shown in FIG. 14. Therein, a' and b' on the axis of ordinate denote the horizontal deviation from the vertical of the first and second links 2, 3 in low and in high gear, respectively. A' and B' on the axis of abscissa denote the angle between the vertical (the center of symmetry of the curve) and the direction of the first and second links 2, 3 in low and high gears, respectively. The horizontal distance between the clamp 1 and the joint 1c is smaller than the horizontal distance between the clamp 1 and the medium sprocket 6b. as shown in FIGS. 9–11. Therefore, A' is smaller than B', and the range between low and high gear lies on an asymmetrical section of the curve. In order to switch from the lowest to the highest gear, the first and second links 2, 3 have to be turned by an angle of A'+B'. Due to the non-linearity of the curve, the angle has to be disproportionally high, resulting in a disproportionally large elastic force of the spring 9 to be overcome, adding to the inconvenience of shifting gears.

SUMMARY OF THE INVENTION

An object of the present invention is to provide a bicycle front derailleur, which is convenient to use.

Another object of the present invention is to provide a bicycle front derailleur, which effectively reduces the force needed to switch into high gear.

Another object of the present invention is to provide a bicycle front derailleur, which gradually increases the leverage, so as to compensate for the increasingly larger force needed to switch into high gear.

The present invention can be more fully understood by reference to the following description and accompanying drawings.

DETAILED DESCRIPTION OF THE PREFERRED EMBODIMENT

Figure 1:
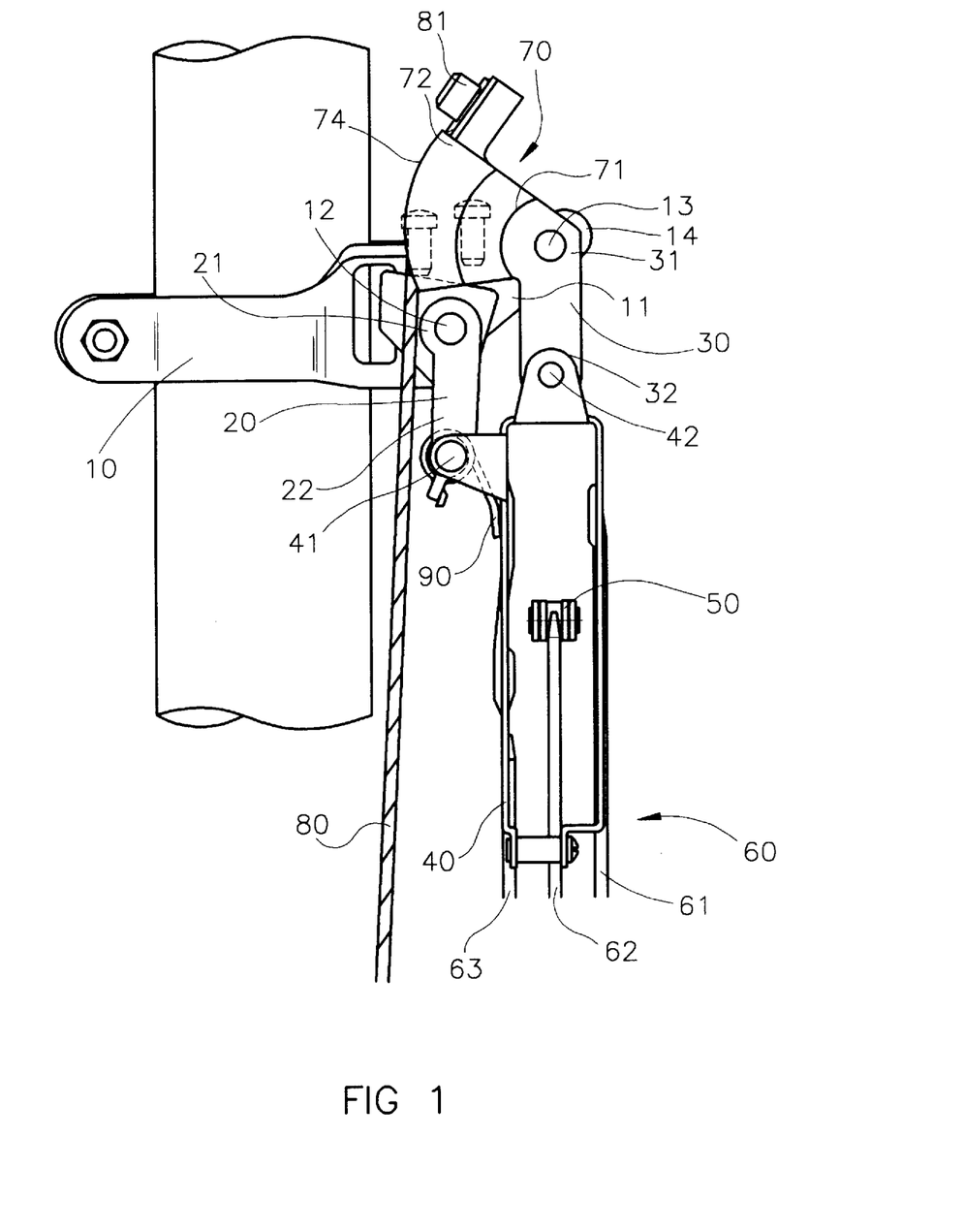
FIG. 1 is a schematic illustration of the present invention, showing the assembly of the structural parts.
Figure 2:
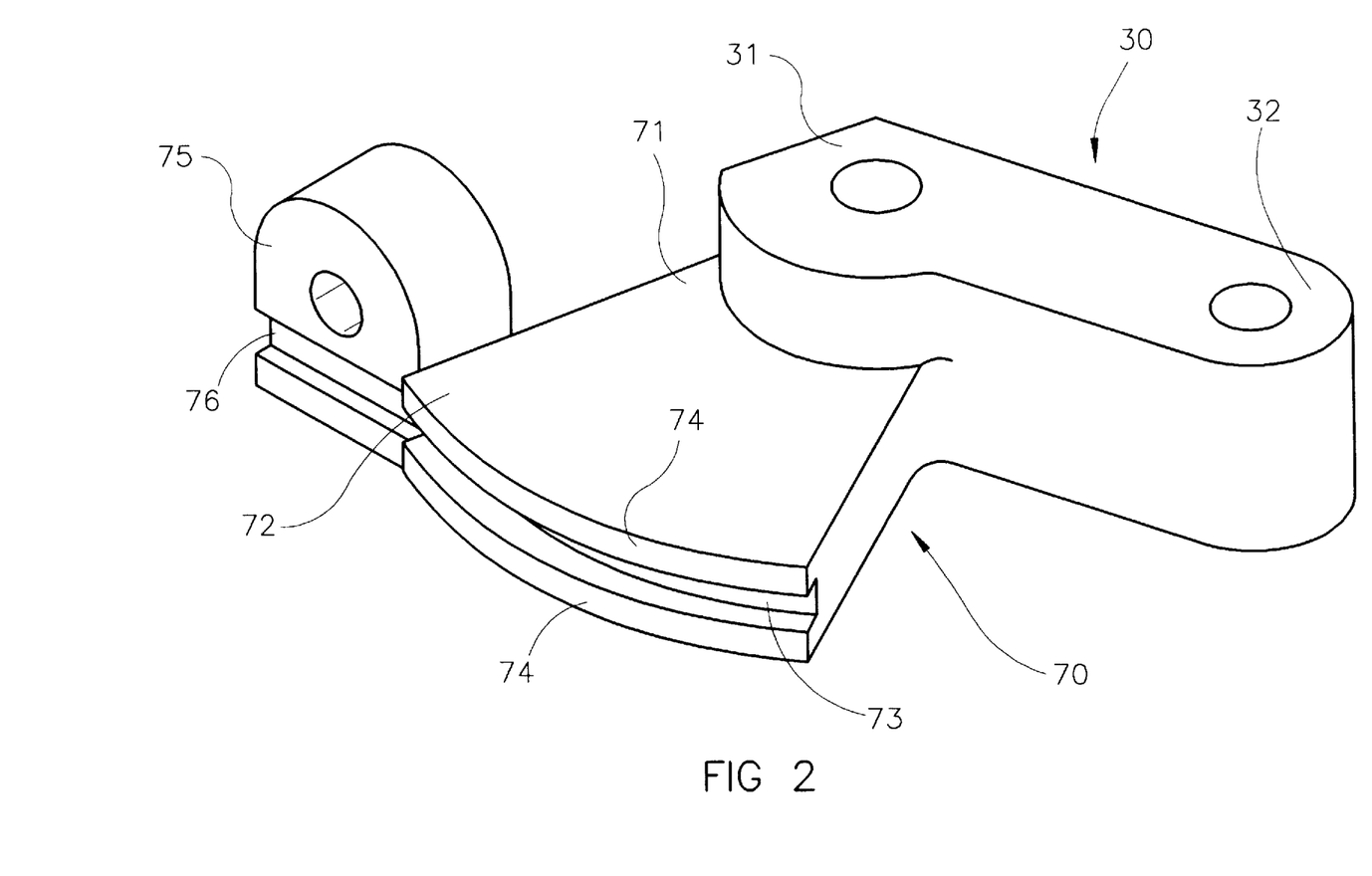
FIG. 2 is a perspective schematic illustration of the lever and the first link of the present invention, showing the leverage increasing with the turning angle.

As shown in FIG. 1, the front derailleur of the present invention is for use in a bicycle with a transmission chain 50 and a chainwheel set 60 with a large sprocket 61, a medium sprocket 62 and a small sprocket 63. The bicycle front derailleur of the present invention mainly comprises a clamp 10, a first link 20, a second link 30, a chain guide 40, an operating cam 70, and a spring 90. By pulling a wire 80, the chain guide 40 is moved and thereby changes the position of the chain 50 towards the large sprocket 61. The operating cam 70 is linked to the second link 30. The far end of the operating cam 70 is formed like an arc. There, force is applied by the wire 80, turning the operating cam 70 and, along with it, the second link 30 by a certain angle and shifting the chain guide 40. The arc of the far end of the operating cam 70 is formed in a way that towards higher gear the lever arm becomes longer. Thereby, given a constant force applied by the wire 80, the resulting torque increases towards higher gear, so as to overcome the increasing counterforce of the spring 90 and the increasing tension of the chain 50. This allows to shift gears smoothly.

Figure 3:
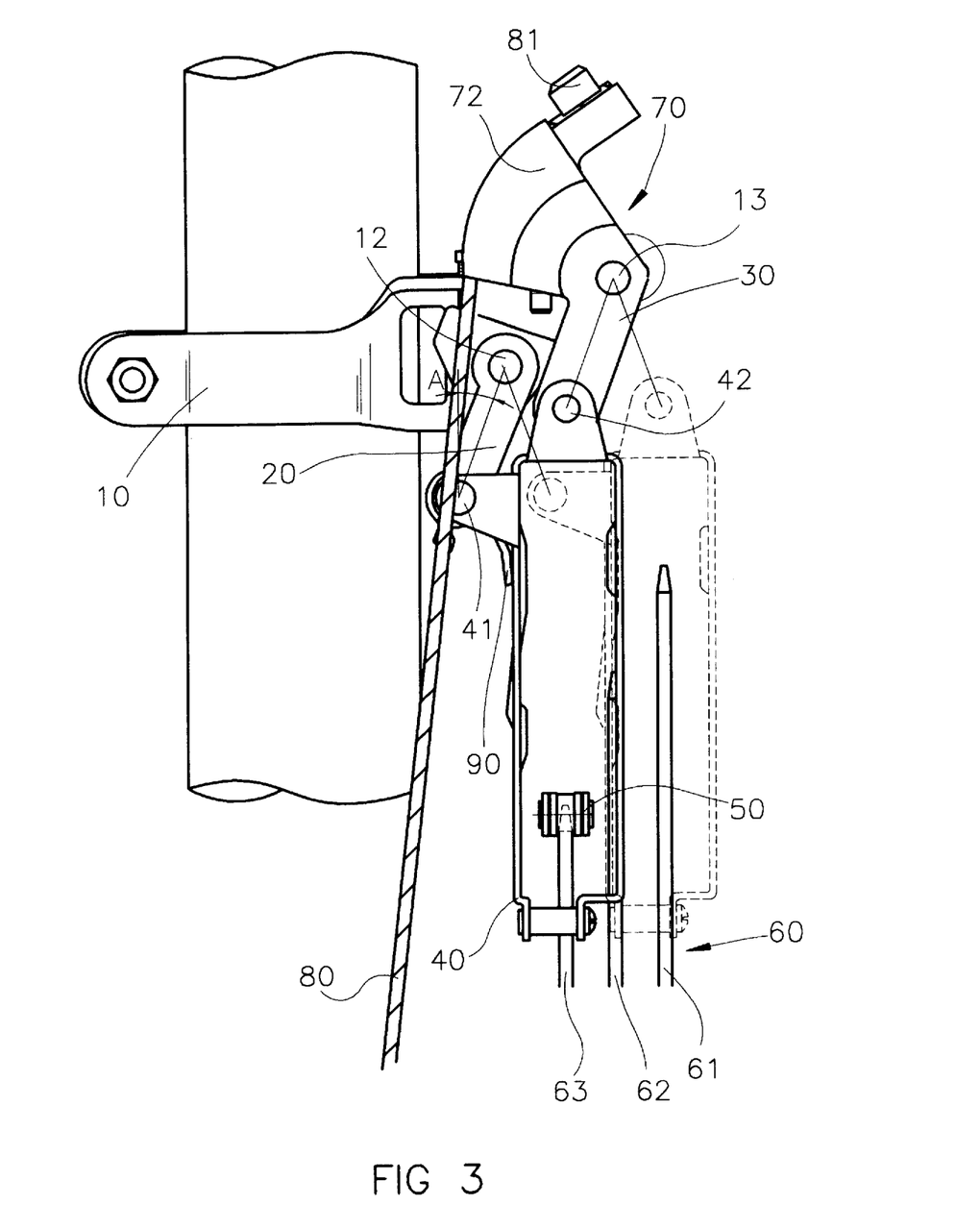
FIG. 3 is a schematic illustration of the working of the present invention in the lowest gear.
Figure 4:
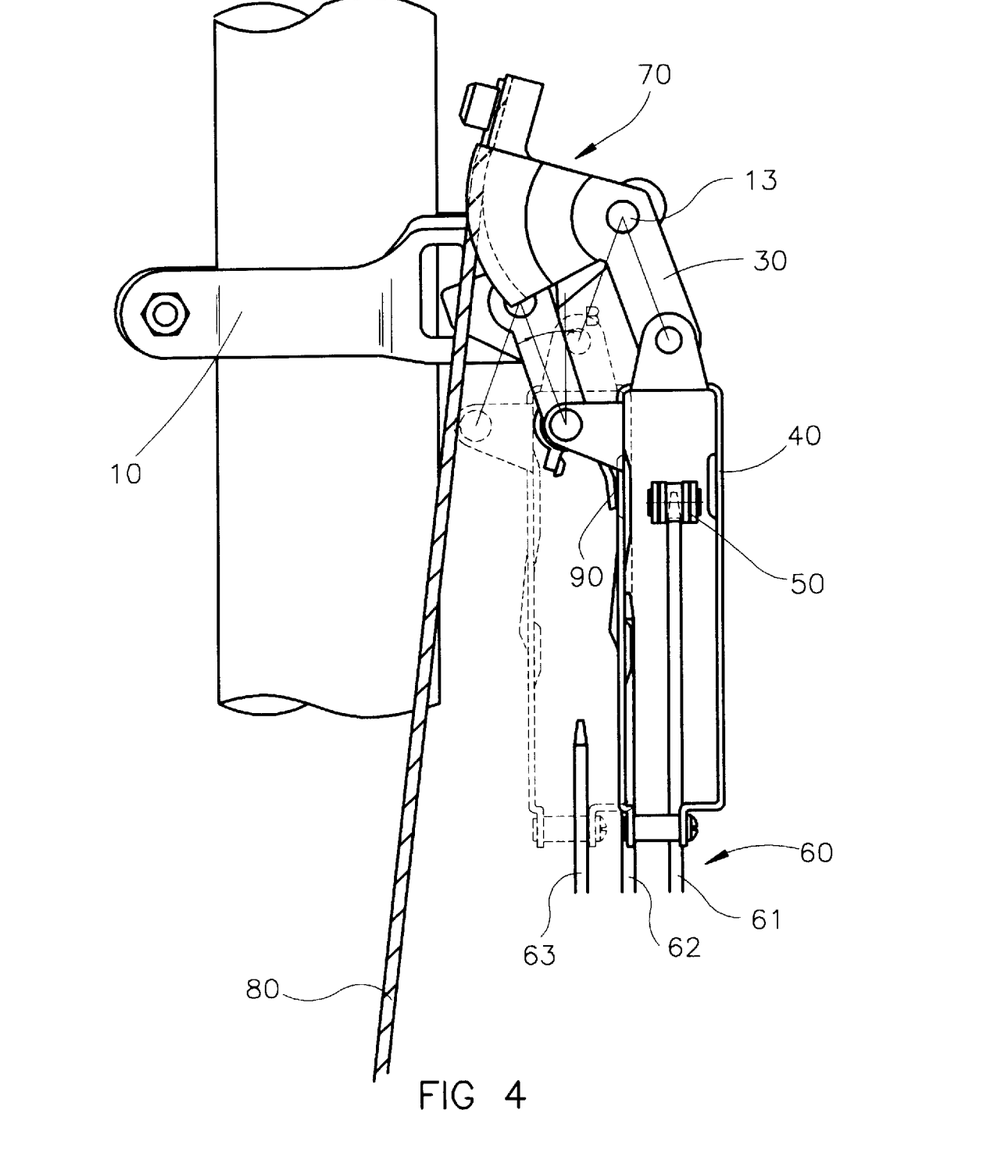
FIG. 4 is a schematic illustration of the working of the present invention in the highest gear.
Figure 5:
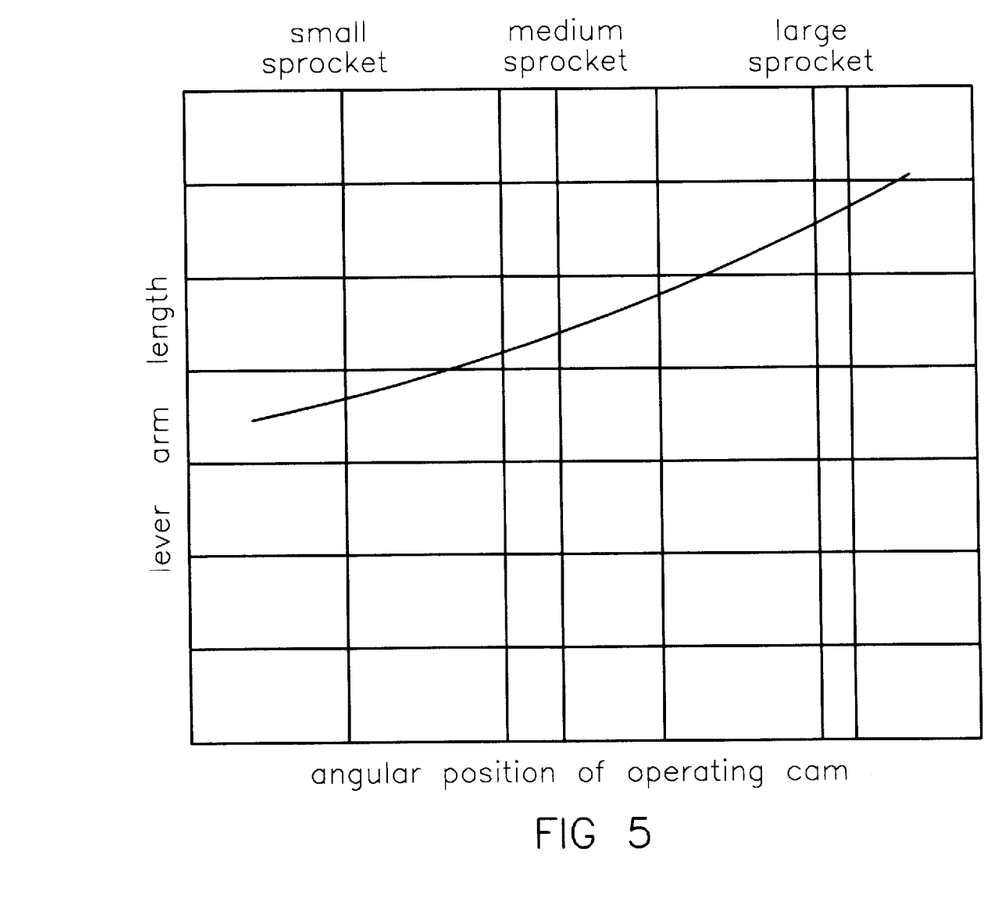
FIG. 5 is a diagram of the lever arm length as a function of the angular position of the lever of the present invention.

Referring to FIGS. 1, 3 and 4, from the clamp 10, a fixing part 11 extends away to a far end 14. The fixing part 11 further has two joints 12, 13. The first link 20 and the second link 30 are respectively by the joints 12, 13 hingedly connected to the fixing part 11, with joint 13 being close to the far end 14.

The second link 30 has an elongated shape with a near end 31 and a far end 32. The near end 31 is connected to the fixing part 11 by the joint 13. The far end 32 extends away, being rotatable around the joint 13. Similarly, the first link 20 has an elongated shape with a near end 21 and a far end 22. The near end 21 is connected to the fixing part 11 by the joint 12. The far end 22 extends away, being rotatable around the joint 12.

The chain guide 40 is connected to the far ends 22, 32 of the first and second links 20, 30 by joints 41, 42, respectively. The joints 12, 13, 41 and 42 form the four corners of a parallelogram. By turning the first and second links 20, 30 around the joints 12, 13, respectively the chain guide 40 is parallelly shifted, thereby taking the chain 50 along and moving it between the large sprocket 61, the medium sprocket 62 and the small sprocket 63. Turning the first and second links 20, 30 counterclockwise (in FIGS. 1, 3 and 4) moves the chain guide 40 up, towards the large sprocket 61.

The spring 90 is mounted at the joint 41, between the first link 20 and the chain guide 40. The elastic force of the spring 90 turns the first link 20 clockwise and moves the chain guide 40 down, towards the small sprocket 63.

The wire 80 has two ends. One end is controlled, i.e., pulled or released by the user. The other end is connected to the operating can 70. When the user pulls the wire 80, torque is applied on the operating cam 70, turning it counterclockwise, thus turning the first and second links 20, 30 counterclockwise, as well.

Figure 6:
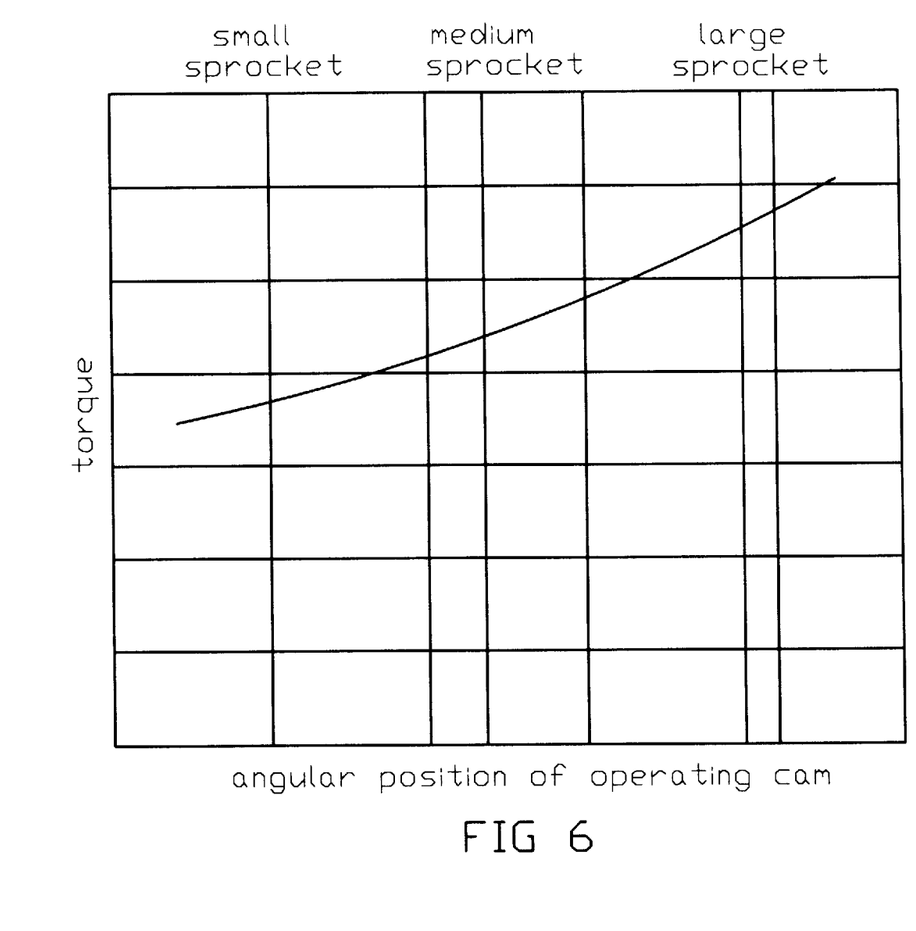
FIG. 6 is a diagram of the torque of the lever as a function of the angular position of the lever of the present invention.

As shown in FIGS. 1–4, the operating cam 70 is roughly shaped like a sector with a peripheral surface 72 and an apex 71 at the joint 13. Into the peripheral surface 72, a groove 73 with walls 74 is cut towards the apex 71 of the operating cam 70. The groove 73 roughly follows the curvature of the peripheral surface 72 and continues in another groove 76 of a holder 75, which is attached to the operating cam 70. The wire 80 is laid into the grooves 73, 76, ending in the groove 76 of the holder, where it is fixed by a screw 81. From there back, the wire 80, lying in the grooves 76 and 73, follows the curvature of the groove 73, leaving the groove 73 at a deviating point to reach straight out into the open air. At the deviating point, torque is applied to the operating cam 70, when the wire 80 is pulled. Pulling the wire 80 causes the operating cam 70 to turn around its apex 71, such that the deviating point is moved along the groove 73 towards the holder 75. The groove 73 is cut in a way, that towards the holder 75 its distance to the apex 71 increases linearly. Therefore, the torque applied to the operating cam 70, when pulling the wire with a constant force, increases linearly with the turning angle of the operating cam 70, as shown in FIG. 6.

Therefore, shifting the chain guide 40 towards higher gear, gradually increases the torque applied. Thereby the increasing counterforce of the spring 90 and of the tension of the chain 50 are overcome.

Figure 7:
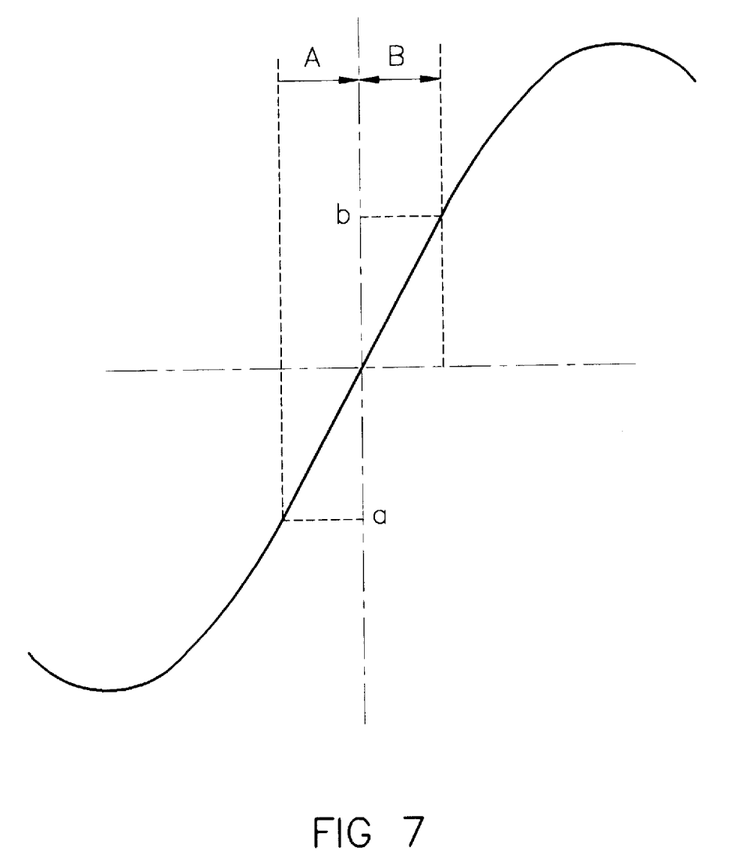
FIG. 7 is a diagram of the horizontal position of the chain guide as a function of the angular position of the lever of the present invention.

In order to provide even smoother operation, when shifting gears, the geometry, regarding the center of rotation of the second link 30, is provided with another improvement. As shown in FIGS. 1, 3 and 4, the horizontal distance between the clamp 10 and the joint 13 is slightly larger than the horizontal distance between the clamp 10 and the medium sprocket 62. When the chain 50 is put on the small sprocket 63, the first and second link 20, 30 extend from the joints 12, 13 at an oblique angle towards the clamp 10, deviating from a vertical line by an angle A. Then the joints 41, 42 at the far ends 22, 32 deviate from a vertical line through the joints 12, 13 by a distance a. When the chain 50 is put on the large sprocket 61, the first and second link 20, 30 extend from the joints 12, 13 at an oblique angle away from the clamp 10, deviating from a vertical line by an angle B. Then the joints 41, 42 at the far ends 22, 32 deviate from a vertical line through the joints 12, 13 by a distance b. The geometry of the present invention is set up in a way that the angles A and B are about equal. In a conventional front derailleur, the setup is strongly asymmetrical. As a consequence, as can be seen in FIGS. 7 and 14, the sum A+B for the geometry of the present invention is smaller than the sum A'+B' for the geometry of a conventional front derailleur. Therefore, to shift the chain 50 from the small sprocket 63 to the large sprocket 61, the first and second links 20, 30 need only be turned by a comparatively small angle A+B. Then the spring 90 is deformed with a comparatively small amplitude, reducing the counterforce thereof, thereby reducing the effort to switch from low to high gear.

Figure 8:
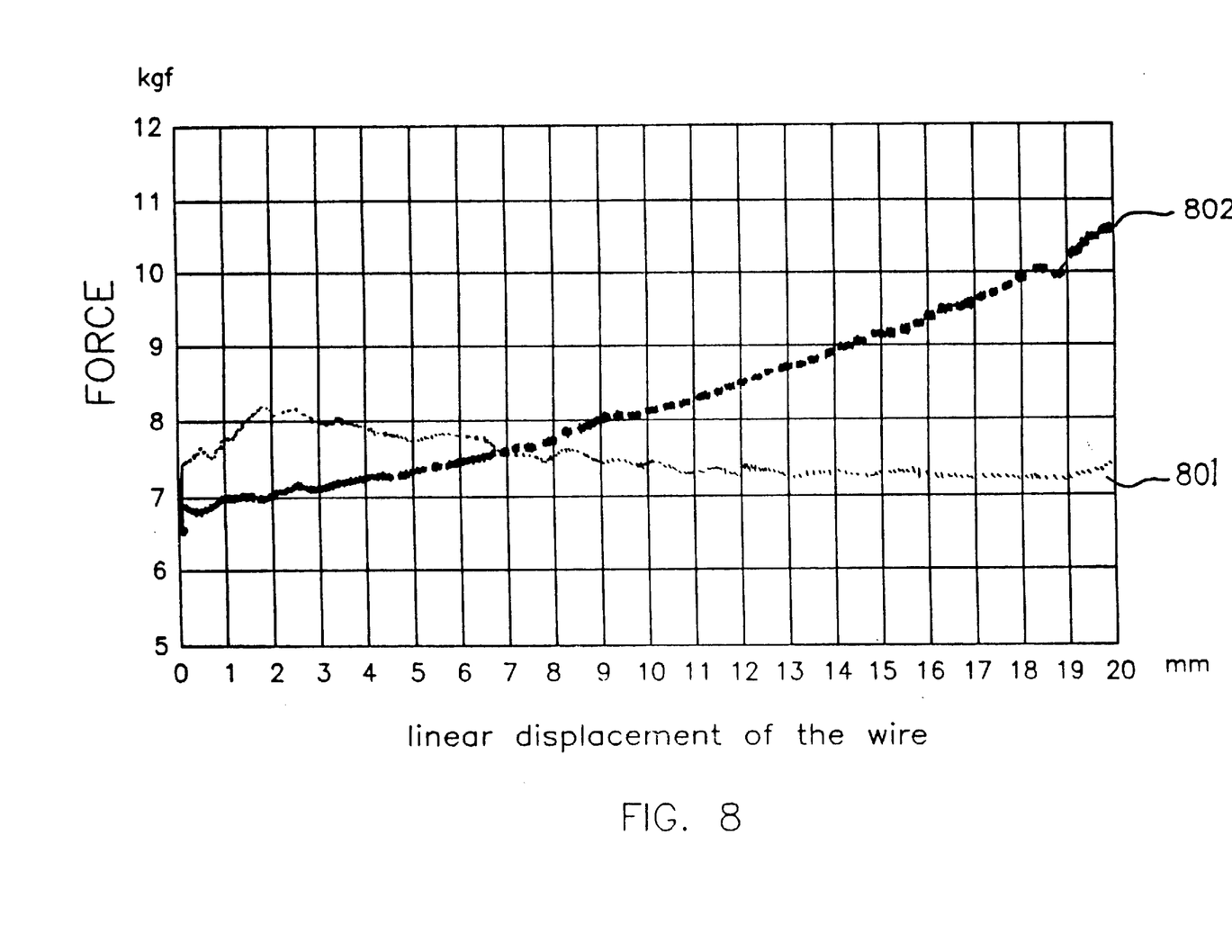
FIG. 8 is a diagram of the force on the wire as a function of the linear displacement of the wire, both for the present invention and a conventional front derailleur.

In FIG. 8 the force for pulling the wire 80 as a function of the longitudinal displacement of the wire 80 is depicted. Curve 801 denotes the function for the present invention, curve 802, for a conventional front derailleur. In a conventional front derailleur, the counterforce to overcome increases considerably with the displacement of the wire 80. In the front derailleur of the present invention, the counterforce remains almost constant, ensuring smooth and convenient operation.

What is claimed is:

1. A bicycle front derailleur, operated by pulling a wire and shifting a chain between a large sprocket, a medium sprocket and a small sprocket, which are arranged on a common axis, defining a horizontal axis, said bicycle front derailleur comprising:

a chain guide for shifting said chain between said large sprocket, said medium sprocket and said small sprocket;

chain guide moving means, connected to said chain guide, for moving said chain guide so as to shift said chain; and a cam lever pivotably connected to said chain guide moving means at a pivoting point for pulling said chain guide moving means when said wire is pulled in a pulling direction:

wherein said cam lever has a cam groove formed on a peripheral surface of said cam lever for receiving said wire, with each point in said cam groove defining a radial distance from said pivoting point;

further wherein said cam lever is structured such that said radial distance between said cam groove and said pivoting point increases in a direction opposite of said pulling direction, so as to provide a greater effective length vertical to said pulling direction when said wire is subject to a greater linear displacement resulting in a greater counterforce.

2. A bicycle front derailleur according to claim 1, wherein said chain-guide moving means comprises:

a clamp, fixed to said bicycle, with an elongated fixing part extending away from said clamp, said fixing part having a first joint and, farther from said clamp, a second joint;

first and second links, each having a near end and a far end, said near ends of said first and second links being hingedly connected to said fixing part at said first and second joints, respectively, said far ends of said first and second links being hingedly connected to said chain guide at a third joint and a fourth joint, respectively, and said first, second, third and fourth joints form four corners of a parallelogram; and a spring, attached to one of said two links;

wherein said linear displacement of said wire causes said two first and second links to turn about said first and second joints, respectively, by an angular displacement and said spring is disposed in a manner so as to reduce said angular displacement.

3. A bicycle front derailleur according to claim 2, wherein said second joint is disposed such that said second joint has a horizontal distance from said clamp is greater than a horizontal distance from said clamp to said medium sprocket.

4. A bicycle front derailleur according to claim 2, wherein said cam groove of said cam lever is structured such that shifting said chain from said small sprocket to said medium sprocket and shifting said chain from said medium sprocket to said large sprocket involve equal changes of said angular displacement.

5. A bicycle front derailleur according to claim 1, wherein said chain guide is connected to said chain guide moving means by third and fourth joints.

6. A bicycle front derailleur according to claim 1, wherein:

said chain guide moving means comprises two links and said cam lever and one of said links are fixed to each other and rotate around said pivoting point so as to cause an angular displacement as a result of said linear displacement of said wire:

said peripheral surface comprises a first end and a second end, and said peripheral surface and said turning point encloses a sector-like area; and said cam lever further comprises a holder attached to said second end of said peripheral surface, for fixing said wire;

whether wherein said wire is fixed on said holder and laid towards said first end along said cam groove until a deviating point, from which said wire extends away from said cam groove along said pulling direction.

7. A bicycle front derailleur according to claim 6, wherein said peripheral surface is parallel relative to said cam groove.

8. A bicycle front derailleur according to claim 6, wherein said wire is totally received by said cam groove.

9. A bicycle front derailleur according to claim 1, wherein said peripheral surface of said cam lever is parallel to said cam groove.

10. A bicycle front derailleur according to claim 1, wherein said wire is completely received by said cam groove.

11. A bicycle front derailleur according to claim 1, wherein said chain guide moving means comprises first and second links which move uniformly with said linear displacement of said wire.

* * * * *